(No Model.)
E. STANCLIFF.
NUT LOCKING BOLT.
No. 537,244. Patented Apr. 9, 1895.
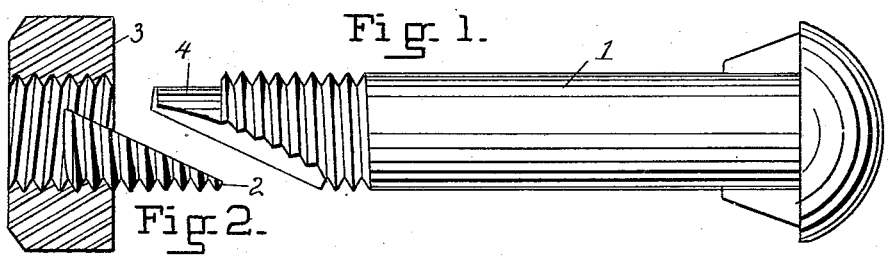
Fig. 1.
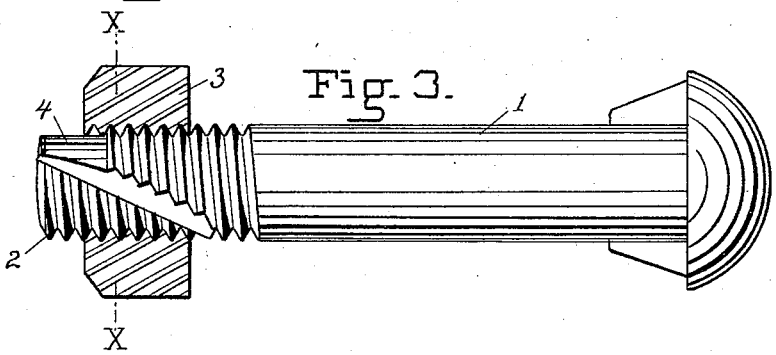
Fig. 2.
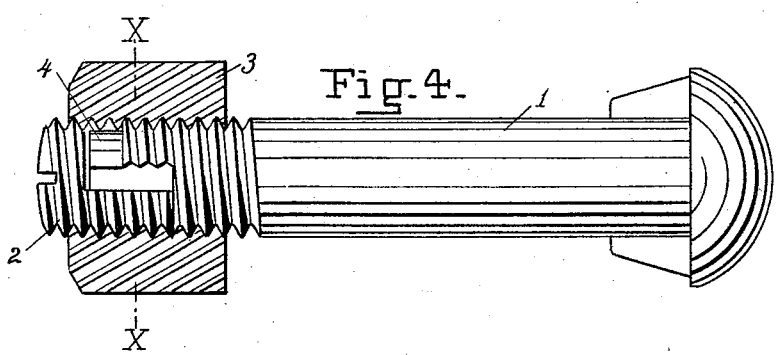
Fig. 3.
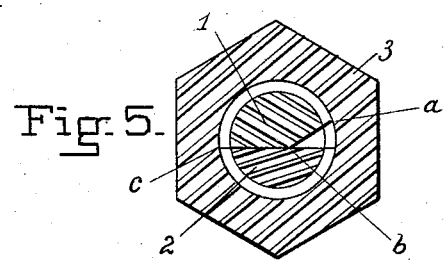
Fig. 4.
Fig. 5.
Witnesses:
Samuel W. Balch.
Hyatt Whitman.
Inventor,
Edwin Stancliff,
by Thomas Ewing Jr.
Attorney.

UNITED STATES PATENT OFFICE.

EDWIN STANCLIFF, OF NEW YORK, N. Y., ASSIGNOR OF ONE-HALF TO THOMAS ORGILL, OF SAME PLACE AND MEMPHIS, TENNESSEE.

NUT-LOCKING BOLT.

SPECIFICATION forming part of Letters Patent No. 537,244, dated April 9, 1895.

Application filed February 28, 1894. Renewed March 7, 1895. Serial No. 540,860. (No model.)

*To all whom it may concern:*

Be it known that I, EDWIN STANCLIFF, a citizen of the United States of America, residing at the city, county, and State of New York, have invented certain new and useful Improvements in Nut-Locking Bolts, of which the following is a specification.

My invention has for its main object to improve the form of the nut-locking bolt shown in my patents Nos. 514,570 and 514,571, both dated February 13, 1894. The preferred forms of nut-locking bolts therein shown show the bolts composed of two parts, one part composing the head, shank and a portion of the thread of the bolt, and the other part, hereinafter called the rocking piece, carrying the rest of the thread of the bolt. These two parts are separated by a plane of separation running in the direction of the length of the bolt, or, at least, having a longitudinal component. One of these parts is beveled on one side by cutting away a portion of the face that contacts with the other part when the two are laid together to form the complete bolt, the bevel being cut in such manner as to form a longitudinal rocking edge, so positioned that if the parts are rocked upon it relatively to each other in one direction, their combined diameter is increased beyond their normal combined diameter. It is not always easy to handle the nut and the rocking piece together and get the nut on to the bolt. To get rid of this difficulty, I remove one or two turns of the thread from the end of one of the parts, preferably the larger part carrying the head and shank, so as to furnish a guide surface onto which the nut, with the rocking piece set in place in it, can be slipped. This secures proper positioning of all the parts without difficulty, to catch the thread of the larger piece.

In the accompanying drawings, which form a part of this specification, Figure 1 shows the part of one of my improvements in nut-locking bolts which composes the head, shank, and a part of the thread of the bolt. Fig. 2 shows the rocking piece in place in the nut. Figs. 1 and 2 together show the parts in position to be joined and have the nut turned on to the bolt. Fig. 3 shows all the parts together, forming the complete bolt with the nut turned on it. Fig. 4 is a modification of my bolt; and Fig. 5 is a section of the nut and bolt on the lines $x-x$ of either Fig. 3 or Fig. 4.

Referring now to Figs. 1, 2 and 3, it will be seen that they show a nut-locking bolt substantially the same as that shown in Fig. 12 of my Patent No. 514,571. The two parts which compose the bolt are separated by a plane of separation, which cuts diagonally across the bolt at its threaded end. There is thus formed on each of the two parts into which the bolt is split a flat face, the two faces being equal. When the two faces are placed together, the bolt is complete. Of these parts, 1 carries the head, fins to hold the part from rotating, the shank of the bolt, and a portion of the thread. The other part, 2, the rocking piece, is simply a section of the threaded end of the bolt. One of these two parts, part 1 as shown herein, is beveled by cutting away a portion of the flat face so as to form a rocking edge. This edge, of course, lies diagonally across the bolt, since it is a line in the diagonal face above referred to. In forming it, less than half of the flat face is cut away, and when seen in the cross-section, (Fig. 5) the rocking edge lies on the side of the longitudinal axis of the bolt toward the point in the circumference from which the bevel is started. This is indicated in Fig. 5 by the fact that the line $c\,b$ is longer than the line $b\,a$.

If the nut 3 is turned on the bolt, the friction between the nut and the thread tends to hold the flat face of the rocking piece 2 against the flat face $c\,b$ of the part 1. When the parts are in this position, the bolt has its normal diameter. When the nut is turned off from the bolt, the friction tends to rock the part 2 on to the rocking edge of the part 1, thus bringing the flat face of part 2 into contact with the face $b\,c$ of the part 1, or tending to do so. This increases the combined diameter of the two parts beyond their normal combined diameter, and causes the nut to bind.

The foregoing describes substantially the same bolt as that shown in the aforesaid Fig. 12 of my Patent No. 514,571. The form of bolt split on the diagonal plane is shown in that patent, but not specifically claimed. It is specifically claimed in this present application.

It will be seen from the foregoing that the thread of the part 2 must combine with the thread of the part 1 to form the thread of the completed bolt, and the two parts must, therefore, fit together properly. Now, in handling the bolt, particularly when used in a structure where it is not easy to get at the bolt, it is not easy to hold the two parts together in proper position while the nut is being turned on. I therefore remove one or two turns of the thread from the end of the part 1, so as to form an unthreaded guiding surface, 4. This guiding surface, of course, extends to the thread on the part 1, and aids in positioning the nut; for if the part 2 be placed in position in the nut 3, and not farther back into the nut than the smooth end 4 of the part 1 will reach when pushed into the nut, then the two parts will properly position themselves as the nut is turned on; but if the part 2 be set too far back in the nut, then, when the end 4 of the part 1 is pushed in, the two parts 1 and 2 will not be in proper position relative to each other, but the part 1 will fall short and there will be a space between the two parts, and the action of the nut in going on will not cause the parts to approach each other so as to close up this space. The result will be that the rocking piece will be loose.

Fig. 4 shows a somewhat different form of the parts. It is like the form shown in Fig. 1 of my said Patent No. 514,571. The bolt is, as is the case with that of the foregoing Figs. 1, 2 and 3, split in two parts. One part, 1, comprises the head, shank and a portion of the thread of the bolt, and the other part, 2, carries the remainder of the thread of the bolt. The surfaces of separation of the parts of the bolt are marked by two transverse lines starting from opposite sides of the bolt, and near the opposite ends of the thread, and a longitudinal line through the body of the bolt which line joins the inner ends of the two transverse lines. This longitudinal line represents a plane of separation which extends entirely across the bolt from side to side. There is thus formed upon each of the parts 1 and 2 a plane face, the two plane faces being equal. A longitudinal wedge is cut off of the part 1 by beveling it, the bevel cutting away less than half of the flat face above referred to, so that in cross-section the parts have the appearance of Fig. 5.

To get the nut off, it is necessary to hold the rocking piece from rocking. To provide for this a slot is cut in the outer end of the rocking piece, into which the end of a screw driver can be inserted. Such a slot is shown on the outer end of the rocking piece of Fig. 4.

I have referred to the forms of bolts as the same as Figs. 12 and 1 of Patent No. 514,571. In this present application, the part which comprises the head shank and a portion of the thread of the bolt is beveled and the rocking piece is not beveled, while in the bolt shown in said Figs. 1 and 12, it is the rocking piece that is beveled; but this difference is immaterial.

Having thus described my invention and the best means known to me for carrying it into effect, without limiting myself to the precise details shown, what I claim, and desire to secure by Letters Patent of the United States, is—

1. A nut-locking bolt split in two parts, one of the parts having an unthreaded end which forms a guiding surface extending to the thread on this part, to position the nut, and one of the parts being beveled to form a rocking edge, substantially as described.

2. A nut-locking bolt split in two parts, one part, constituting the main part of the bolt, having an unthreaded end which forms a guiding surface extending to the thread on this part, to position the nut, the other part being a rocking piece, one of the two parts being provided with a rocking edge, substantially as described.

3. A nut-locking bolt split in two parts on a plane which cuts diagonally through the threaded portion of the bolt, one of the parts, constituting the main part of the bolt, having an unthreaded end which forms a guiding surface extending to the thread on this part, to position the nut, and the other part being a rocking piece, one of the parts being provided with a rocking edge, substantially as described.

4. A nut-locking bolt split in two parts by a plane cutting diagonally through the threaded portion of the bolt, one of the parts being beveled by cutting away a portion of the plane face that contacts with the other part, there being thus formed a rocking edge that lies in the general direction of the length of the bolt, and is so positioned that if the parts are rocked relatively to each other upon this rocking edge in one direction, their combined diameter is increased beyond their normal combined diameter, so that the nut is turned off with difficulty and is turned on with comparative ease, substantially as described.

EDWIN STANCLIFF.

In presence of—
THOMAS EWING, Jr.,
SAMUEL W. BALCH.